(12) United States Patent
Zuraski, Jr. et al.

(10) Patent No.: US 7,080,170 B1
(45) Date of Patent: Jul. 18, 2006

(54) CIRCULAR BUFFER USING AGE VECTORS

(75) Inventors: Gerald D. Zuraski, Jr., Austin, TX (US); Brian D. McMinn, Buda, TX (US); Michael K. Ciraula, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 336 days.

(21) Appl. No.: 10/653,750

(22) Filed: Sep. 3, 2003

(51) Int. Cl.
*G06F 3/00* (2006.01)
*G06F 9/30* (2006.01)

(52) U.S. Cl. .................... 710/52; 710/55; 712/214; 712/216

(58) Field of Classification Search .............. 710/52; 712/214, 216
See application file for complete search history.

(56) References Cited

U.S. PATENT DOCUMENTS

| | | | |
|---|---|---|---|
| 4,312,074 A | 1/1982 | Pautler et al. | |
| 5,537,552 A | 7/1996 | Ogasawara et al. | |
| 5,584,037 A | 12/1996 | Papworth et al. | |
| 5,586,295 A | 12/1996 | Tran | |
| 5,774,712 A * | 6/1998 | Cheong et al. | 712/245 |
| 5,778,245 A | 7/1998 | Papworth et al. | |
| 5,829,028 A | 10/1998 | Lynch et al. | |
| 5,859,992 A | 1/1999 | Tran et al. | |
| 5,878,244 A | 3/1999 | Witt et al. | |
| 5,919,251 A * | 7/1999 | Tran | 710/52 |
| 6,178,497 B1 * | 1/2001 | Frederick et al. | 712/214 |
| 6,785,802 B1 * | 8/2004 | Roy | 712/216 |
| 6,873,184 B1 | 3/2005 | McMinn et al. | 326/46 |

OTHER PUBLICATIONS

"Energy-Effective Issue Logic," Folegnani, et al., IEEE, 2001, 5 pages.

\* cited by examiner

*Primary Examiner*—Kim Huynh
*Assistant Examiner*—Alan S Chen
(74) *Attorney, Agent, or Firm*—Lawrence J. Merkel; Meyertons, Hood, Kivlin, Kowert & Goetzel, P.C.

(57) ABSTRACT

An apparatus comprises a buffer comprising a plurality of entries, a plurality of age vectors, and a control circuit coupled to the buffer. Each of the age vectors corresponds to one or more of the entries. Responsive to data being provided to the buffer to be written to at least a first entry, the control circuit is configured to generate a first age vector. The first age vector corresponds to the first entry, and is indicative of which of the plurality of entries contain data that is older than the data being written to the first entry. The control circuit is configured to select an entry for reading responsive to the plurality of age vectors. The selected entry has an attribute used to select the selected entry, and other entries indicated as storing older data in the age vector corresponding to the selected entry do not have the attribute.

19 Claims, 11 Drawing Sheets

CIRCULAR BUFFER USING AGE VECTORS

BACKGROUND OF THE INVENTION

1. Field of the Invention

This invention is related to the field of digital logic and, more particularly, to circular buffers used in digital logic.

2. Description of the Related Art

Integrated circuits of various types use buffers to store data in an ordered fashion. The order of the data is typically the order in which the data is stored into the buffer over time. Data may be removed from within the buffer (as opposed to only the oldest data, which is at the "bottom" of the buffer), but generally older data (data which was stored in the buffer earlier in time than other data within the buffer) is favored for selection over newer data (data which is stored in the buffer later in time than other data within the buffer).

Buffers may have many different uses in integrated circuits (such as processors). For example, a processor may implement a reorder buffer, a scheduler, a retire queue, a load/store buffer, etc. Each of the above may implement buffers to store various data (e.g. instruction execution results, instructions, addresses of loads/stores, etc.). Generally, a buffer includes multiple entries of equal size. Each of the entries is configured to store a datum.

Buffers may physically be implemented in a number of ways. Two often-used implementations are the shifting buffer and the circular buffer. In the shifting buffer, one entry within the buffer is permanently assigned to be the "bottom" entry in the buffer. A datum being stored into the buffer is stored into the entry which is nearest the bottom entry and which is currently empty. As data is removed from the bottom entries in the buffer, data stored in other entries within the buffer is shifted down such that the bottom entry is filled with the oldest remaining datum and other entries nearest the bottom are filled with the remaining data.

On the other hand, the circular buffer does not shift data from entry to entry. A datum stored into a particular entry in the circular buffer remains in the particular entry. A head pointer (or delete pointer, as used herein) is used to indicate the "bottom" entry, and a tail pointer (or insert pointer, as used herein) is used to indicate the entry into which new data is to be stored. Deleting data from the buffer is accomplished by modifying the head (delete) pointer, and adding data to the buffer is accomplished by storing the data into the entry indicated by the tail pointer and modifying the tail (insert) pointer.

In many ways, the circular buffer may be superior to or equal to the shifting buffer (in terms of complexity, area consumption, speed, power consumption, etc.). However, one way in which the circular buffer may not be superior to the shifting buffer is in finding the first entry having a particular attribute (referred to herein as the "find first" function). That is, locating the first entry, beginning at the head (delete) pointer and moving toward the tail (insert) pointer, that has the particular attribute. In the shifting buffer, the head is fixed and thus the logic for the find first function is straightforward. On the other hand, in the circular buffer, the buffer is effectively scanned beginning at an arbitrary point (the entry indicated by the head (delete) pointer) and ending at an arbitrary point (the entry indicated by the tail (insert) pointer).

SUMMARY OF THE INVENTION

In one embodiment, an apparatus comprises a buffer comprising a plurality of entries, a plurality of age vectors, and a control circuit coupled to the buffer. Each of the plurality of age vectors corresponds to one or more of the plurality of entries. Responsive to data being provided to the buffer to be written to at least a first entry of the plurality of entries, the control circuit is configured to generate a first age vector of the plurality of age vectors. The first age vector corresponds to at least the first entry, wherein the first age vector is indicative of which of the plurality of entries contain data that is older than the data being written to the first entry. The control circuit is configured to select a selected entry of the plurality of entries for reading responsive to the plurality of age vectors, the selected entry being the entry of the plurality of entries that: (i) has an attribute used to select the selected entry, and (ii) other entries indicated as storing older data in the age vector corresponding to the selected entry do not have the attribute. A processor comprising one or more circular buffers is contemplated, each of the circular buffers comprising the apparatus.

A method is contemplated for some embodiments. Data to be written to at least a first entry of a plurality of entries in a buffer is received in the buffer. A first age vector of a plurality of age vectors is generated responsive to receiving the data. Each of the plurality of age vectors corresponds to one or more of the plurality of entries. The first age vector corresponds to at least the first entry, and is indicative of which of the plurality of entries contain data that is older than the data being written to the first entry. A selected entry of the plurality of entries is selected for reading responsive to the plurality of age vectors, the selected entry being the entry of the plurality of entries that: (i) has an attribute used to select the selected entry, and (ii) other entries indicated as storing older data in the age vector corresponding to the selected entry do not have the attribute.

BRIEF DESCRIPTION OF THE DRAWINGS

The following detailed description makes reference to the accompanying drawings, which are now briefly described.

Figure 1:
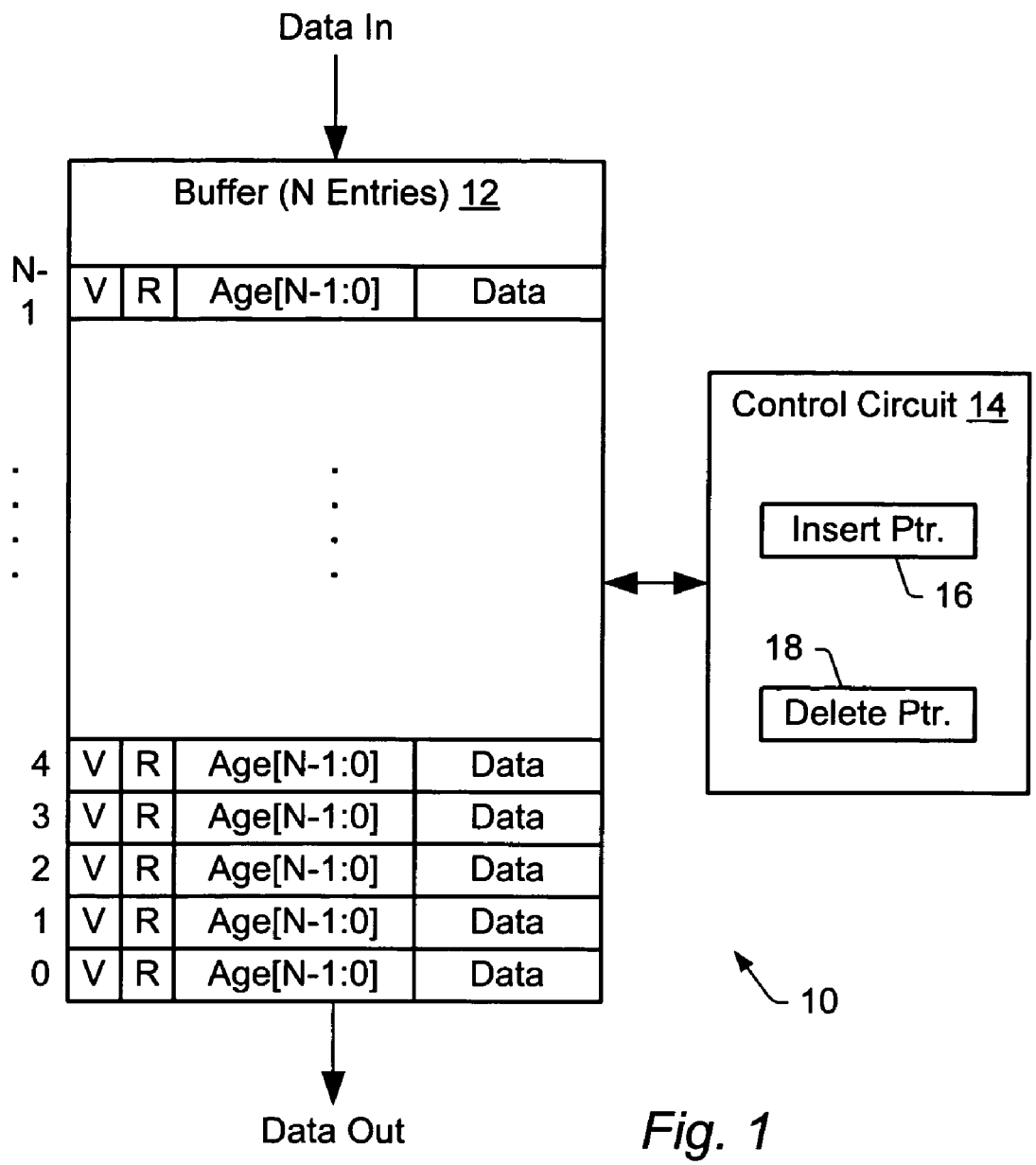
FIG. 1 is a block diagram of one embodiment of a circular buffer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

In the description below, various bits will be described and a meaning will be assigned to the set and clear states of the bits. For example, the valid bit, ready bit, and age vector bits are described. In each case, the meanings of the set and clear states of the bits may be reversed from that described below. Furthermore, any indication (bit or multi-bit) may be used in the place of the described bits, where the indication is capable of indicating at least two states. In general, the indication may be set to a first state (e.g. a set or clear state of a bit) to indicate one meaning (e.g. older, for an age vector indication) and may be set to a second state (e.g. the clear or set state of a bit, whichever is not used as the first state) to indicate another meaning (e.g. newer, for an age vector indication).

Circular Buffer

Turning now to FIG. 1, a block diagram of one embodiment of a circular buffer 10 is shown. In the embodiment of FIG. 1, the circular buffer 10 includes a buffer 12 and a control circuit 14 coupled to the buffer 12. The buffer 12 is coupled to receive data (Data In in FIG. 1) to be written to one or more entries of the buffer 12. Additionally, the buffer 12 is coupled to provide data read from an entry of the buffer 12 (Data Out in FIG. 1). The buffer 12 comprises N entries (where N is an integer greater than one), and the entries are labeled 0 though N−1 in FIG. 1. The control circuit 14 includes an insert pointer 16 and a delete pointer 18.

As mentioned above, circular buffers such as circular buffer 10 may store data into an entry or entries of the buffer, and the data may remain stored in that same entry or entries for the life of the data in the buffer. The delete pointer 18 may point to the entry storing the oldest data in the buffer, and the insert pointer 16 may point to the next entry to store data. As data is added to the buffer, the insert pointer 16 is modified to indicate the next entry to store data. As data is deleted from the buffer, the delete pointer 18 is modified to indicate the entry storing the oldest data in the buffer after the data is deleted. Thus, at any given point in time, the entries of the buffer 12 that store valid data are the entries between the delete pointer 18 and the insert pointer 16.

For example, entry 0 may be the initial entry to be written with data, followed by entry 1, etc. The insert pointer 16 may be incremented each time data is written to one or more entries, indicating the next available entry. Once entry N−1 is written with data, the insert pointer 16 "wraps around" to entry 0. Similarly, the delete pointer 18 is incremented as the data in various entries is deleted, and the delete pointer 18 wraps around to entry 0 after the data in entry N−1 is deleted. This example will be assumed for the remainder of this description. Alternatively, entry N−1 may be the initial entry to be written, followed by entry N−2, etc. The insert pointer 16 may be decremented each time data is written to one or more entries. Once entry 0 is written with data, the insert pointer 16 wraps around to entry N−1. Similarly, the delete pointer 18 is decremented as data in various entries is deleted, and the delete pointer wraps around to entry N−1 once the data in entry 0 is deleted.

Several entries of the buffer 12 are illustrated in FIG. 1 (e.g. entries 0 through 4 and N−1). Each entry may include at least the data stored in that entry (Data in FIG. 1). In the illustrated embodiment, each entry includes an age vector (Age[N−1:0] in FIG. 1), a ready bit (R in FIG. 1), and a valid bit (V in FIG. 1). Various other information may be stored in each entry, and the illustrated information may be deleted, in various other embodiments.

Generally, the age vector corresponding to an entry may indicate which other entries in the buffer 12 are storing data that is older than the data in that entry. Entries not indicated in the age vector as storing data that is older than the data in that entry are storing data that is newer than the data in that entry (or are not storing data at all). As used herein, first data is "older" than second data if the first data is considered to be ordered prior to the second data. For example, first data may be older than second data if the first data was provided to the buffer 12 prior, in time, to the second data. First data may also be older than second data provided concurrently to the buffer 12 if there is some indication that the first data is ordered prior to the second data (e.g. positionally with the Data In, or additional signals indicating which data is ordered prior to the other data). Similarly, first data may be "newer" than second data if the first data is considered to be ordered subsequent to the second data. Newer data may also be referred to as "younger" data. For convenience herein, entries may be referred to as older or newer than other entries. Such language generally means that the data in the entries is older or newer than the data in the other entries.

In one implementation, the age vector may include a plurality of bits. Each bit, in the embodiment of FIG. 1, may correspond to one other entry in the buffer 12. The bit may indicate, when set, that the other entry is older than the entry to which the age vector corresponds. The bit may indicate, when clear, that the other entry is newer than the entry to which the age vector corresponds. For example, as shown in FIG. 1, the age vector may include bits N−1 to 0. Bit 0 may correspond to entry 0, bit 1 may correspond to entry 1, etc. up to bit N−1 corresponding to entry N−1.

The control circuit 14 may generate the age vector for the data in a given entry when the data is provided to the circular buffer 10 for storage. At that point, the data stored in the circular buffer 10 is known to be older than the data being provided for storage. Thus, age vector bits corresponding to each entry having valid data may be set, and age vector bits corresponding to entries not having valid data may be clear. Alternatively, all age vector bits may be set, as described in more detail below.

The control circuit 14 may read data from entries in the buffer 12 for output (Data Out in FIG. 1). As described below, the ready bit for an entry may indicate whether or not the data in that entry is ready to be read. The control circuit 14 may qualify the ready bit for a given entry with whether or not older entries (as indicated in the age vector for the given entry) have set ready bits to generate the select signal for the given entry. That is, the select signal may be asserted if: (i) the ready bit for the given entry is set; and (ii) the ready bit for each older entry is clear. Thus, at most one select signal may be asserted, and that select signal corresponds to the oldest entry that has its ready bit set. More generally, the select signal may be asserted if: (i) the given entry has the attribute used for the find first function; and (ii) each older entry (as indicated in the age vector) does not have the attribute.

In this manner, the find first function may be performed independently and in parallel for each entry. The find first function may be, in some embodiments, a fairly rapid calculation and thus the find first function may be rapid. Additionally, the complexity of the find first function may be reduced, in some embodiments.

The control circuit 14 may also update the age vectors corresponding to valid entries to reflect changes in the data stored in the buffer 12. For example, in embodiments in which the age vector is generated by setting bits for valid entries and clearing bits for invalid entries, the age vectors may be updated as data is deleted from the buffer 12. Particularly, age vector bits corresponding to the entries from which data is deleted may be cleared, in this embodiment. For embodiments in which the age vector is generated by setting each bit, the age vector bits may be updated as data is inserted into the buffer. Particularly, age vector bits corresponding to entries into which data is being written may be cleared.

The valid bit may be indicative, when set, that the entry is valid (that is, that data is currently being stored in the entry) and indicative, when clear, that the entry is invalid (that is, data is not currently being stored in the entry). Generally, the valid bits for entries that are not between the delete pointer 18 and the insert pointer 16 may not be set. Valid bits may be set or clear for entries that are between the delete pointer 18 and the insert pointer 16, if entries may be invalidated prior to the delete pointer 18 being modified to move passed the entry. For example, if data may be deleted from the buffer 12 out of order with respect to the order that the data is written to the buffer 12, valid bits may be cleared to indicate invalidity. In other embodiments, data may be considered valid in the buffer 12 if the data is in an entry between the delete pointer 18 and the insert pointer 16 and invalid otherwise, and the valid bit may be eliminated.

The ready bit may be an attribute on which the find first function is applied for reading data from the buffer 12. The ready bit may be set to indicate that the data in the entry has the attribute (e.g. ready for reading), and the ready bit may be cleared to indicate that the data does not have the attribute (e.g. not ready for reading). In general, the attribute may be any attribute corresponding to the data which may indicate that the data is ready to be read from the buffer 12. For example, if the circular buffer 10 is implemented in a scheduler, the data may include an operation to be executed and the attribute may be whether or not the operands of the operation are ready. If the circular buffer 10 is implemented in a retire queue, the data may include whether or not an exception was detected and the attribute may be whether or not the operation is ready for retirement. If the circular buffer 10 is implemented in a load/store buffer as a load/store queue, the attribute may be whether or not the address is available for transmission to a cache, whether or not the operation is retired, etc. Many uses for the circular buffer 10 are possible, and the attribute on which the find first function is applied may vary from implementation to implementation. Furthermore, multiple independent find first functions may be applied on various attributes of the data, in some embodiments. It is noted that, while the ready bit is illustrated in the present embodiments as being stored in the entries, the ready bit may be calculated each time a read of the buffer 12 is attempted, based on information in the entry, other information supplied to the circular buffer 10, etc.

It is noted that, while the age vectors are illustrated as being stored in the buffer 12 (each age vector stored in the entry to which that age vector corresponds), other embodiments may implement a separate memory (e.g. within the control circuit 14 or coupled thereto) to store the age vectors. The age vectors are illustrated in FIG. 1 as having a bit for each entry (e.g. N−1:0). However, for each age vector, the age vector bit that would correspond to the entry to which the age vector corresponds may not actually be implemented. For example, the age vector for entry 0 may not include bit 0 (the bit corresponding to entry 0 in the age vector). Similarly, the age vector for entry 1 may not include bit 1 (the bit corresponding to entry 1 in the age vector), etc.

Figure 2:
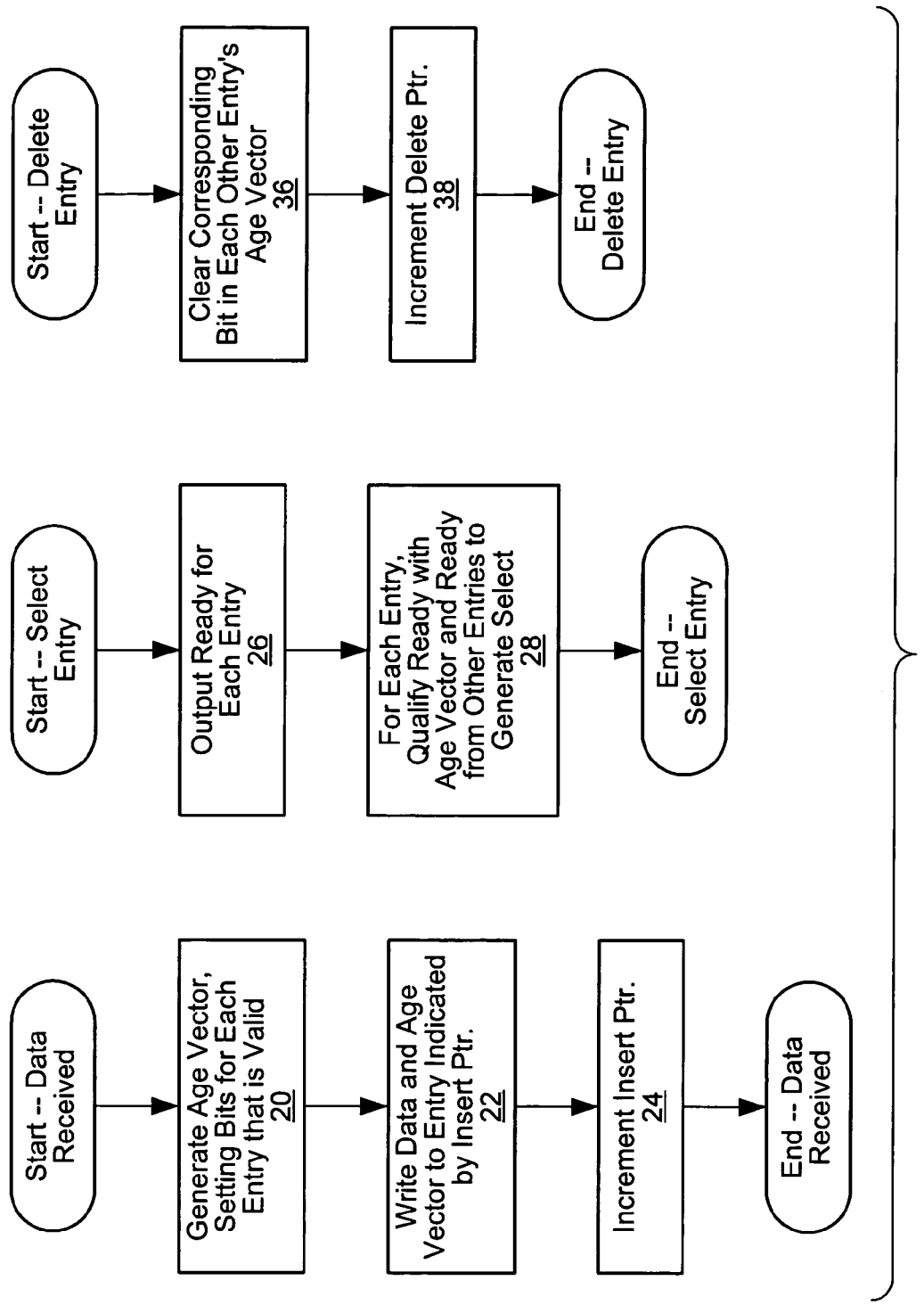
FIG. 2 is a set of flowcharts illustrating operation of one embodiment of the control circuit shown in FIG. 1.

Turning now to FIG. 2, a set of flowcharts is shown illustrating operation of one embodiment of the control circuit 14. While the blocks shown are illustrated in a particular order for ease of understanding, the blocks may be performed in various orders or in parallel by the digital logic circuitry within the control circuit 14. Additionally, various blocks may be pipelined over two or more clock cycles, as desired.

The first flowchart (on the left in FIG. 2) illustrates operation in response to receiving data to be written to the buffer 12. In response to receiving the data, the control circuit 14 may generate the age vector (block 20). In this embodiment, the age vector may be generated by setting the age vector bits corresponding to each entry having valid data (e.g. each entry for which the valid bit is set). The control circuit 14 writes the data and the generated age vector to the entry indicated by the insert pointer (block 22) and sets the valid bit in the entry. The control circuit 14 also increments the insert pointer 16 (block 24).

It is noted that data for multiple entries may be received concurrently. In such an embodiment, block 20 may represent generating age vectors for each entry. The data for the entries may have an order, and bits in the age vectors for data that is not first in order for the entry to be written with the data that is first in order may be set. Similar operation may be provided for other data in the order. Additionally, block 22 may represent writing each data and its age vector to consecutive entries beginning with the entry indicated by the insert pointer 16. Block 24 may represent incrementing the insert pointer 16 to pass each of the written entries.

The second flowchart (in the middle in FIG. 2) illustrates operation to select an entry for reading from the buffer 12. The buffer 12 may output the ready bit from each entry (block 26). As mentioned above, in other embodiments, the ready bit may be calculated rather than stored in the entry. For each entry, the control circuit 14 qualifies the ready bit with the age vector from that entry and ready bits from the other entries to generate the select signal (block 28). The select signal for a given entry may be asserted if the ready bit for that entry is set and the ready bit is clear for each other entry for which the corresponding age vector bit is set.

Figure 3:
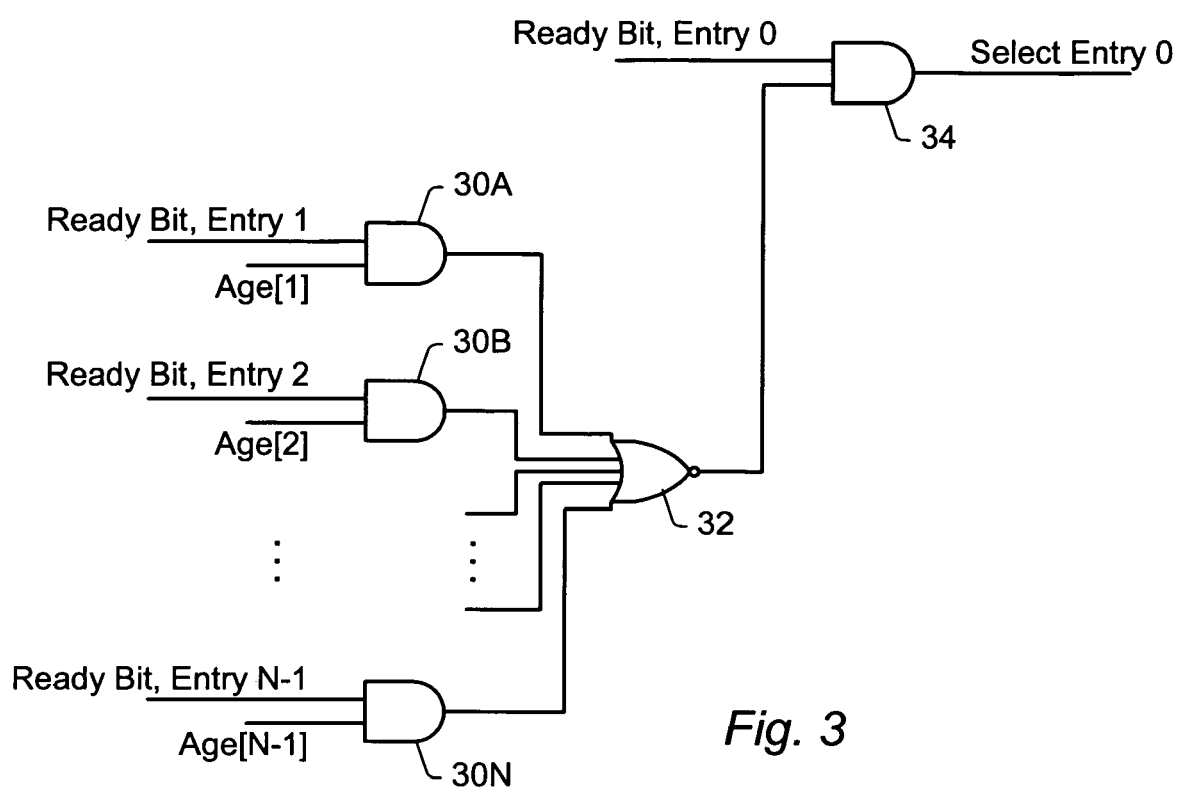
FIG. 3 is a circuit diagram illustrating one embodiment of selection logic for the control circuit shown in FIG. 1.

An exemplary circuit diagram of one embodiment of a circuit for generating the select signal for entry 0 is shown in FIG. 3. A similar circuit may be employed by the control circuit 14 for each entry in the buffer 12. In FIG. 3, a set of AND gates 30A–30N are provided to logically AND the ready bits from each other entry (e.g. entries 1 through N−1) with the corresponding age vector bits from the age vector for entry 0 (illustrated as Age[1], Age[2], etc. in FIG. 3). Only the AND gates 30A, 30B, and 30N are shown in FIG. 3. However, an AND gate 30A–30N may be provided for each other entry. The outputs of the AND gates 30A–30N are coupled to a NOR gate 32, which logically NORs the results. Accordingly, the output of the NOR gate 32 is a logical one if none of the outputs of the AND gates 30A–30N are logical one. That is, the output of the NOR gate 32 is a logical one if none of the older entries has a ready bit set. The output of the NOR gate 32 is input to an AND gate 34, which also receives the ready bit of entry 0 as an input. The output of the AND gate 34 is the select signal for entry 0. The select signal is thus asserted if the ready bit for entry 0 is set and none of the older entries has a ready bit set.

It is noted that many other variations of the circuit shown in FIG. 3 are possible. For example, if the set and clear states of the age vector bits and/or the ready bits are changed, different circuitry would be used. Furthermore, any Boolean equivalents of the circuits shown may be used. For example, the NOR gate 32 is an N−1 input NOR gate, which may be realized by multiple levels of logic gates, in some embodiments. The circuit of FIG. 3 may be realized using any digital logic circuits (e.g. static, dynamic, etc.).

Returning to FIG. 2, the third flowchart (on the right in FIG. 2) illustrates operation to delete data from an entry. The data may be deleted from the entry indicated by the delete pointer (the "deleted entry"). The control circuit 14 may clear the bit corresponding to the deleted entry in each other entry's age vector (block 36). For example, if entry 0 is the deleted entry, bit 0 of each other entry's age vector may be cleared. Additionally, the control circuit 14 may increment the delete pointer 18 (block 38) and may clear the valid bit in the deleted entry. It is noted that multiple entries may be deleted concurrently. In such a case, block 36 may represent clearing each corresponding bit in each other entry's age vector. The delete pointer 18 may be incremented to pass each of the deleted entries.

The embodiment illustrated by the flowcharts in FIG. 2 sets the age vector bits only for those entries having valid data. In another embodiment, all of the age vector bits may be set. Effectively, the entry being written is indicated as being newer than each other entry in the buffer 12. Such an embodiment may be used since the entries which are not valid may also not have their ready bits set. Thus, these "invalid" entries may not prevent selection of the entry. Additionally, in such an embodiment, the age vector bits corresponding to a given entry in other entries may be cleared in response to writing new data into the given entry, thus indicating that the entry is not older than the given entry.

Figure 4:
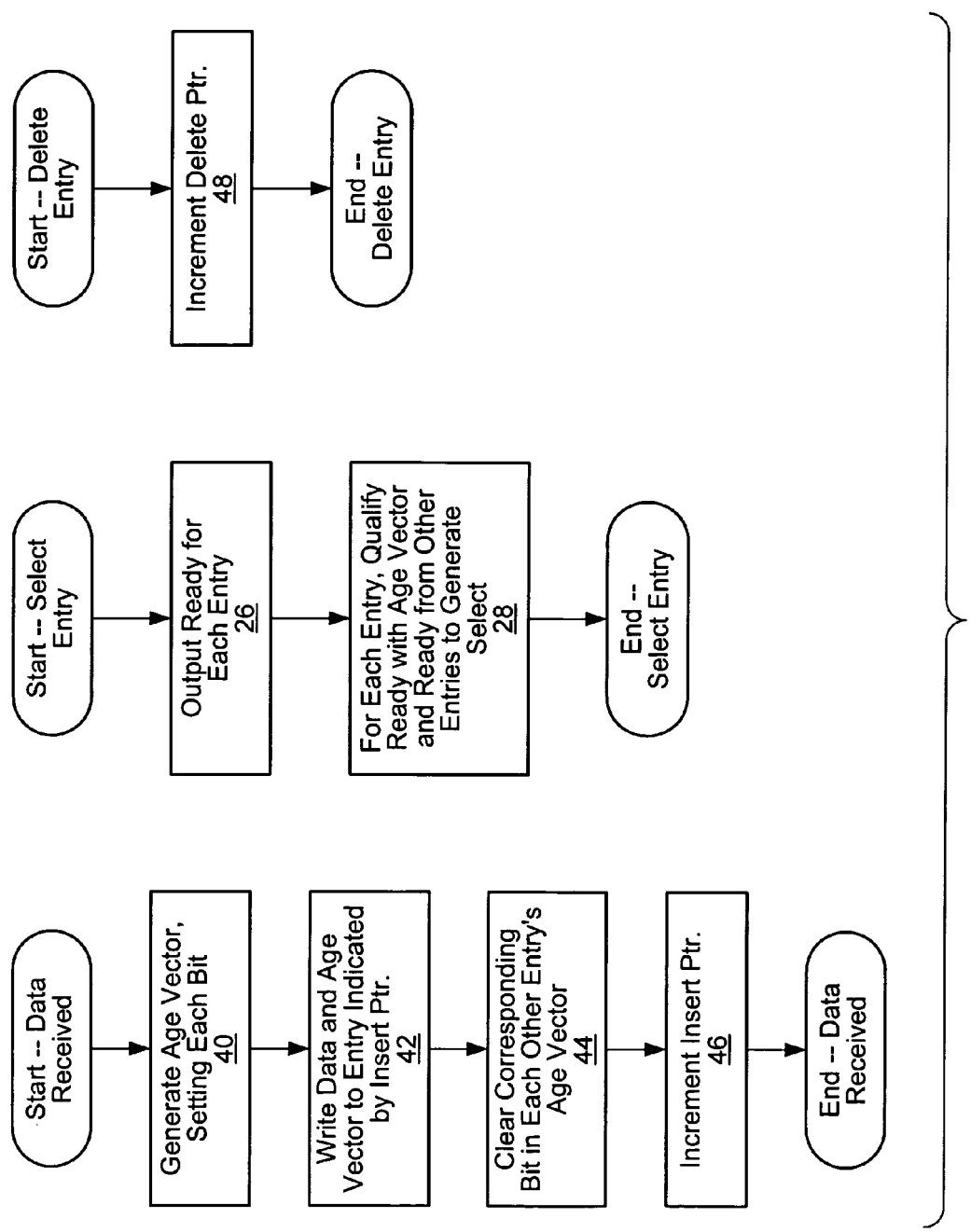
FIG. 4 is a set of flowcharts illustrating operation of a second embodiment of the control circuit shown in FIG. 1.

FIG. 4 is a set of flowcharts illustrating operation of one embodiment of the control circuit 14 which generates the age vectors with all bits set when the corresponding entry is written with new data. While the blocks shown are illustrated in a particular order for ease of understanding, the blocks may be performed in various orders or in parallel by the digital logic circuitry within the control circuit 14. Additionally, various blocks may be pipelined over two or more clock cycles, as desired.

The first flowchart (on the left in FIG. 4) illustrates operation in response to receiving data to be written to the buffer 12. In response to receiving the data, the control circuit 14 may generate the age vector (block 40). In this embodiment, the age vector may be generated by setting each of the age vector bits. The control circuit 14 writes the data and the generated age vector to the entry indicated by the insert pointer (block 42) and sets the valid bit. Additionally, the control circuit 14 clears the age vector bit corresponding to the entry being written in each other entry's age vector (block 44), since the entry is newer than each other entry at this point. The control circuit 14 increments the insert pointer 16 (block 46).

It is noted that data for multiple entries may be received concurrently. In such an embodiment, block 40 may represent generating age vectors for each entry. Additionally, block 42 may represent writing each data and its age vector to consecutive entries beginning with the entry indicated by the insert pointer 16. Block 44 may represent clearing the age vector bits for each entry being written, except that the order of the concurrently received data may be respected (e.g. the age vector bit for the entry receiving data that is first in order may not be cleared in the age vectors corresponding to the other received data, and similar operation may be provided for other data in the order). Block 46 may represent incrementing the insert pointer 16 to pass each of the written entries.

Operation of the control circuit 14 to select an entry to be read from the buffer may be similar to the embodiment of FIG. 2, and thus the same flowchart is shown in FIG. 4 (blocks 26 and 28, the middle flowchart in FIG. 4). A circuit similar to the circuit shown in FIG. 3 may be used, in some implementations.

The third flowchart (on the right in FIG. 4) illustrates operation to delete data from an entry. In this embodiment, the age vectors are not updated in response to deletion of data. Thus, the control circuit 14 may increment the delete pointer 18 (block 48) and may clear the valid bit in the deleted entry. It is noted that multiple entries may be deleted concurrently. In such a case, block 48 may represent incrementing the delete pointer 18 to pass each of the deleted entries.

The embodiments described with respect to FIGS. 1–4 maintain an age vector for each entry. In other embodiments, entries may be grouped and an age vector may be maintained for each group. There may be a plurality of groups, each entry belonging to a group. The groups may be non-overlapping (that is, each entry may belong to only one group). The age vector may indicate the age of entries in the group as a whole, as compared to each of the other groups. Thus, the age vector may include an age vector bit for each other group, for example. The grouped embodiment may be used, for example, when multiple entries are known to be written concurrently. For example, if the Data In input supplies four entries of data concurrently, then groups of four may be used. Even if data is not received concurrently, if a group of entries can be categorized as known to be of approximately the same age, then the grouped embodiment may be used. Generally, as long as the order of entries within a group may be determined (or if the order within the group does not matter, e.g. random selection could be used), the grouped embodiment may be used.

Figure 5:
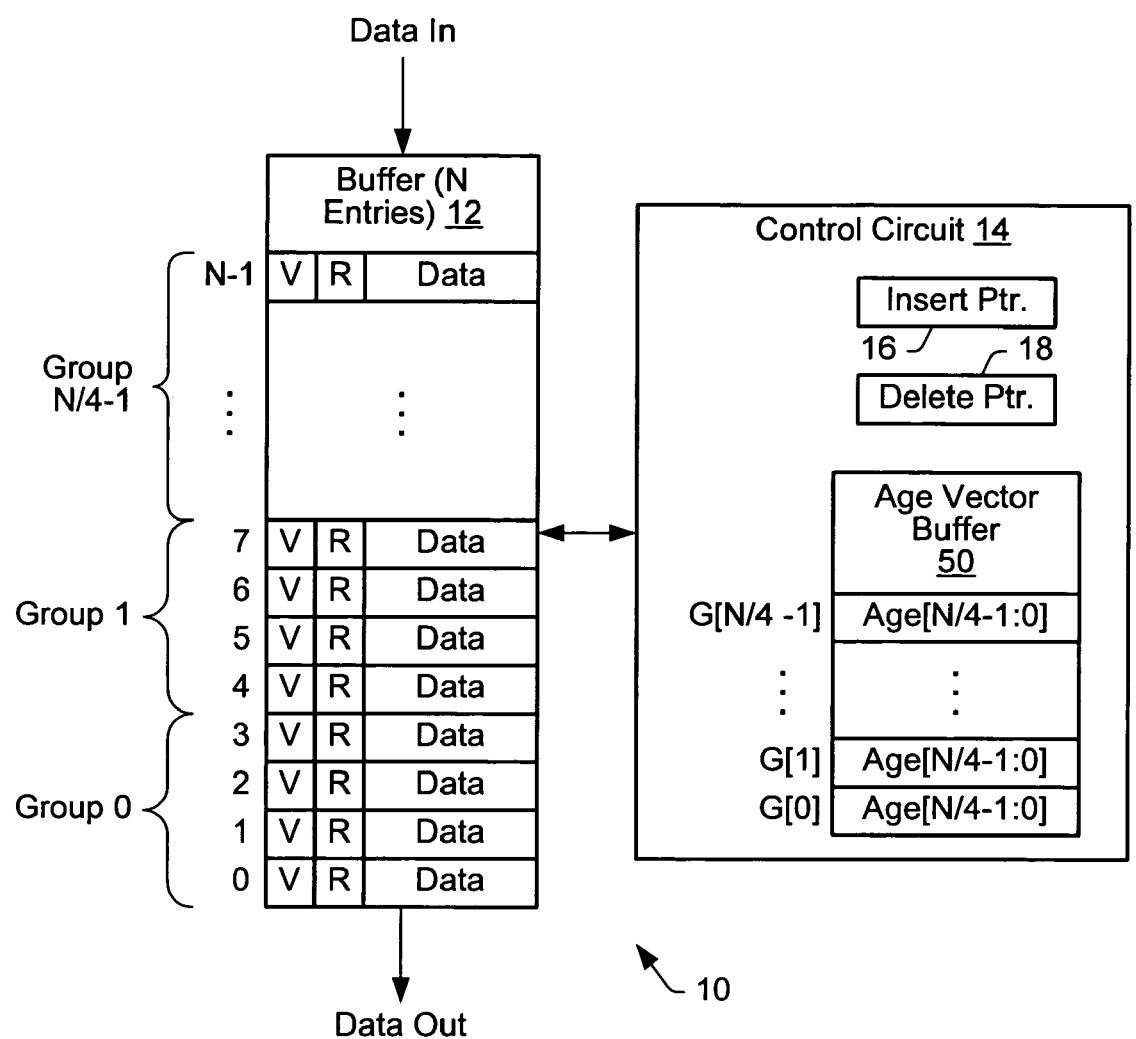
FIG. 5 is a block diagram of a second embodiment of the circular buffer.

FIG. 5 is a block diagram of one embodiment of the circular buffer 10 which implements grouping of entries. The embodiment of FIG. 5 includes the buffer 12 coupled to the control circuit 14, similar to the embodiment of FIG. 1. Similar to the embodiment of FIG. 1, the control circuit 14 may include the insert pointer 16 and the delete pointer 18. The entries of the buffer 12 may include the valid bit, the ready bit, and the data, similar to the embodiment of FIG. 1. Additionally, the control circuit 14 may include (or be coupled to) an age vector buffer 50.

The entries of the buffer 12 are logically grouped, as illustrated by the braces to the left of the buffer 12 in FIG. 5. For example, entries 0, 1, 2, and 3 form group 0, entries 4, 5, 6, and 7 form group 1, etc. up to group N/4−1 formed from entries N−1, N−2, N−3, and N−4 (not all shown in FIG. 5). The age vector buffer 50 stores an age vector corresponding to each group.

Generally, the embodiment of FIG. 5 divides the find first function into two levels, and independent selection mechanisms may be implemented at each level. The selection mechanisms at various levels may differ or may be the same. For example, in one embodiment, at the group level, the age vectors may be used to select which group includes the entry to be selected. A group may be eligible for selection if at least one entry within the group is eligible (e.g. its ready bit is set). Within each group, an entry may be selected to be read if that group is selected. Each group may have an entry selected independently and in parallel. The selected group may then output the data from its selected entry. In this manner, the complexity of the find first function may be reduced (and the speed of the find first function may be increased) in some embodiments. For example, in the illustrated embodiment, the complexity of the group-level selection mechanism may be reduced by a factor of 4 (the number of entries in a group). Other embodiments may have more or fewer entries in a group, although at least two entries may be included in each group.

In one implementation, the age vector mechanism may be used at the group level to select a group. Any of the embodiments described with regard to FIGS. 1–4 may be implemented, where "group" may be substituted for "entry" in terms of the age vector indications. The valid bits of the entries may be logically ORed to generate the valid bit for the group, and similarly the ready bits may be logically ORed to generate the ready bit for the group. Furthermore, a given age vector corresponds to the entries in a group. Accordingly, as used herein, an age vector "corresponding to an entry" may refer to an age vector that corresponds only to that entry, or that corresponds to the entry and one or more other entries as a group.

Within the group, any mechanism may be used to select an entry within the group. For example, the group may be ordered positionally (e.g. entry 0 may be ordered ahead of entries 1–3, and thus may be selected within group 0 if ready; entry 1 may be ordered ahead of entries 2–3 and thus may be selected within group 0 if ready and entry 0 is not ready, etc.). Alternatively, age vectors may be used within the group as well, if desired.

One issue that may occur with grouping is if the insert pointer 16 wraps around the buffer 12 and both the insert pointer 16 and the delete pointer 18 point to entries within the same group. For example, the pointers may be incremented as the travel around the buffer 12. In such a case, if the insert pointer 16 wraps around and both pointers point to entries within the same group, entries low in the group may actually be newer then entries higher in the group. For example, if the delete pointer 18 points to entry 3 and the insert pointer 16 points to entry 2, the data in entries 0 and 1 are newer than the data in entry 3. The control circuit 14 may be configured to correctly select an entry in the group that is storing older data (e.g. the entry storing the oldest data) in situations where the insert pointer has wrapped around the buffer 12, even if both the entry storing older data and entries storing younger data are eligible for selection (e.g. ready bits are set). In some embodiments, the control circuit 14 may prevent the insertion of new data into entries of a group if the delete pointer 18 is also pointing into the same group, and is greater than the insert pointer 16. Alternatively, the control circuit 14 may permit insertion of the new data, but may prevent the new data from setting its ready bit. In either case, the prevention is continued until the delete pointer 18 increments into the next group. In embodiments using the age vectors within groups, the age vectors may handle these situations correctly.

It is noted that, while two levels of selection are used (group-level and intra-group level), other embodiments may implement additional levels, as desired.

Figure 6:
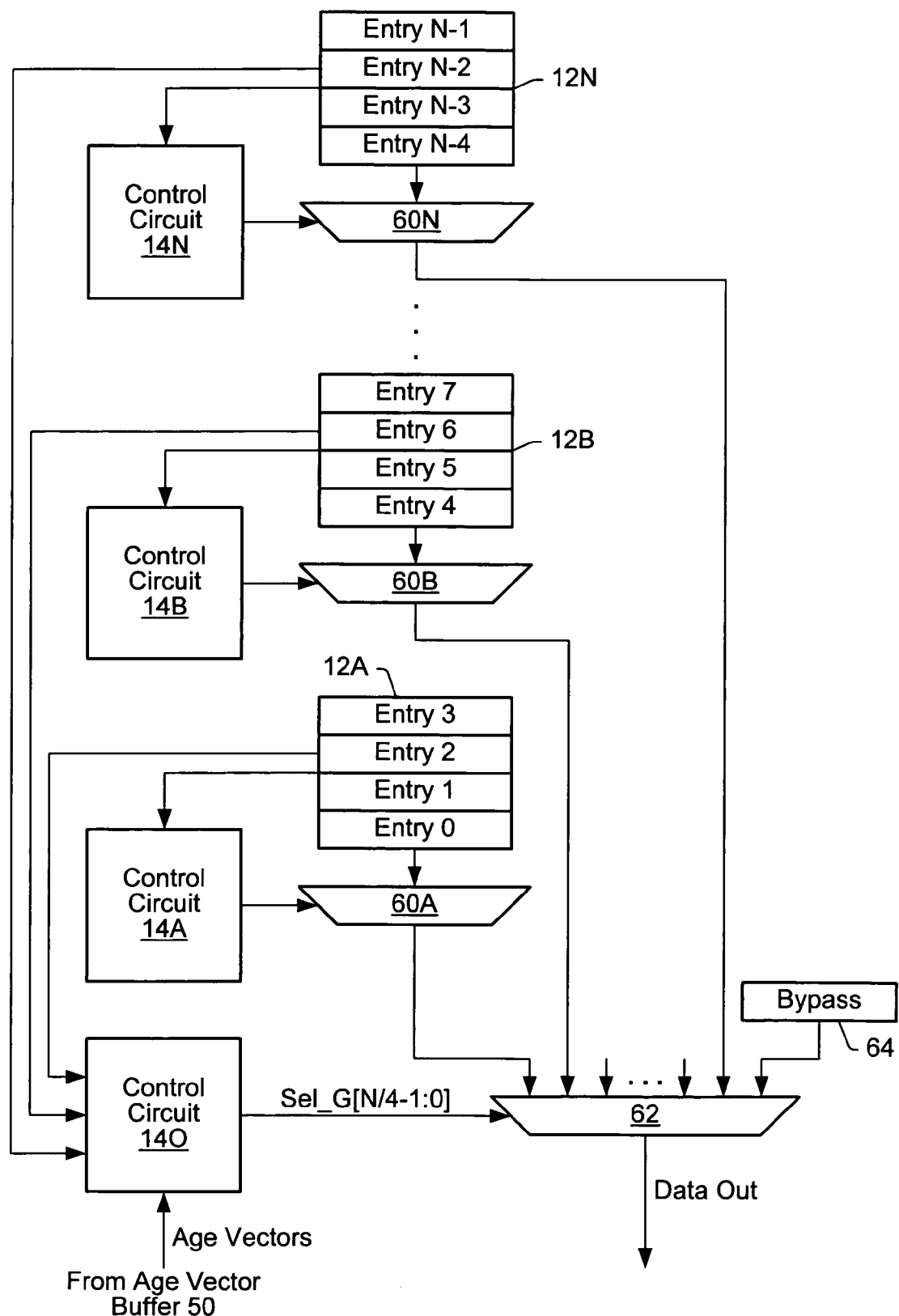
FIG. 6 is a block diagram illustrating the buffer and control circuit shown in FIG. 5 in greater detail for one embodiment.

Turning next to FIG. 6, a block diagram of one embodiment of selection circuitry details for one embodiment of the control circuit 14 and also illustrates one embodiment of the buffer 12. More particularly, the buffer 12 is illustrated as separated into portions corresponding to the groups into which entries are divided (e.g. buffer portion 12A comprises group 0 entries, buffer portion 12B comprises group 1 entries, etc., to buffer portion 12N comprising group N/4-1 entries. Each buffer portion 12A–12N is coupled to a respective multiplexor (mux) 60A–60N, which is coupled to a respective control circuit 14A–14N (each of which may be portions of the control circuit 14). The control circuits 14A–14N may also be coupled to respective buffer portions 12A–12N. The outputs of muxes 60A–60N are coupled as inputs to a mux 62, which is coupled to a control circuit 14O (which may also be a portion of the control circuit 14). The output of mux 62 may be the Data Out output of the buffer 12 as shown in FIG. 5. An additional bypass path 64 may be provided in some embodiments.

Generally, each of the control circuits 14A–14N may, independently and in parallel, select one of the entries in the corresponding buffer portion 12A–12N for output. Any mechanism may be used (e.g. intra-group age vectors, positional ordering, etc.). The control circuits 14A–14N may receive the ready bits from each entry in the respective buffer portion 12A–12N and may apply the selection mechanism to the ready bits. The control circuits 14A–14N each generate selection controls to the respective muxes 60A–60N, selecting the data to be output from one of the entries.

The control circuit 14O may apply the group-level selection mechanism to selection one of the groups to output data, and may generate the group selection signals (Sel_G[N/4-1:0] in FIG. 6) to select the group through mux 62. For example, the age vectors may be used at the group level. The control circuit 14O may be coupled to receive information from the various entries to perform the group-level selection (e.g. the ready bits from each entry may be received and the age vectors from the age vector buffer 50 may be received). If none of the groups are selected, the bypass path 64 may be selected. The bypass path 64 may bypass data from the input of the buffer 10 to its output. In some embodiments of the circular buffer 10 implemented in a scheduler, for example, the bypass path may be used to bypass new instructions fetched in response to a misprediction detected by the processor, since the instructions in the scheduler may be from the mispredicted path.

In one embodiment, at least the control circuits 14A–14N, the muxes 60A–60N, and the buffer 12 circuitry may be implemented as static digital logic circuitry. Such an implementation may exhibit lower power consumption than if dynamic digital logic circuitry were used. The reduced power consumption, in some embodiments may be significant since, once an entry becomes ready for selection, it may be fairly rare for that readiness to change. Thus, the selection generated by the control circuits 14A–14N may change rarely, which may lead to lower power consumption for static digital logic circuitry. Dynamic digital logic circuitry precharges and evaluates each cycle, thus consuming power even if the selections do not change. Additionally, implementing static digital logic circuitry may be a safer design (e.g. reduced noise problems, etc.). In some embodiments, the control circuit 14O and mux 62 may be implemented with dynamic digital logic circuitry (e.g. the embodiment illustrated in FIG. 7), while in other embodiments static digital logic circuitry may be used.

Figure 7:
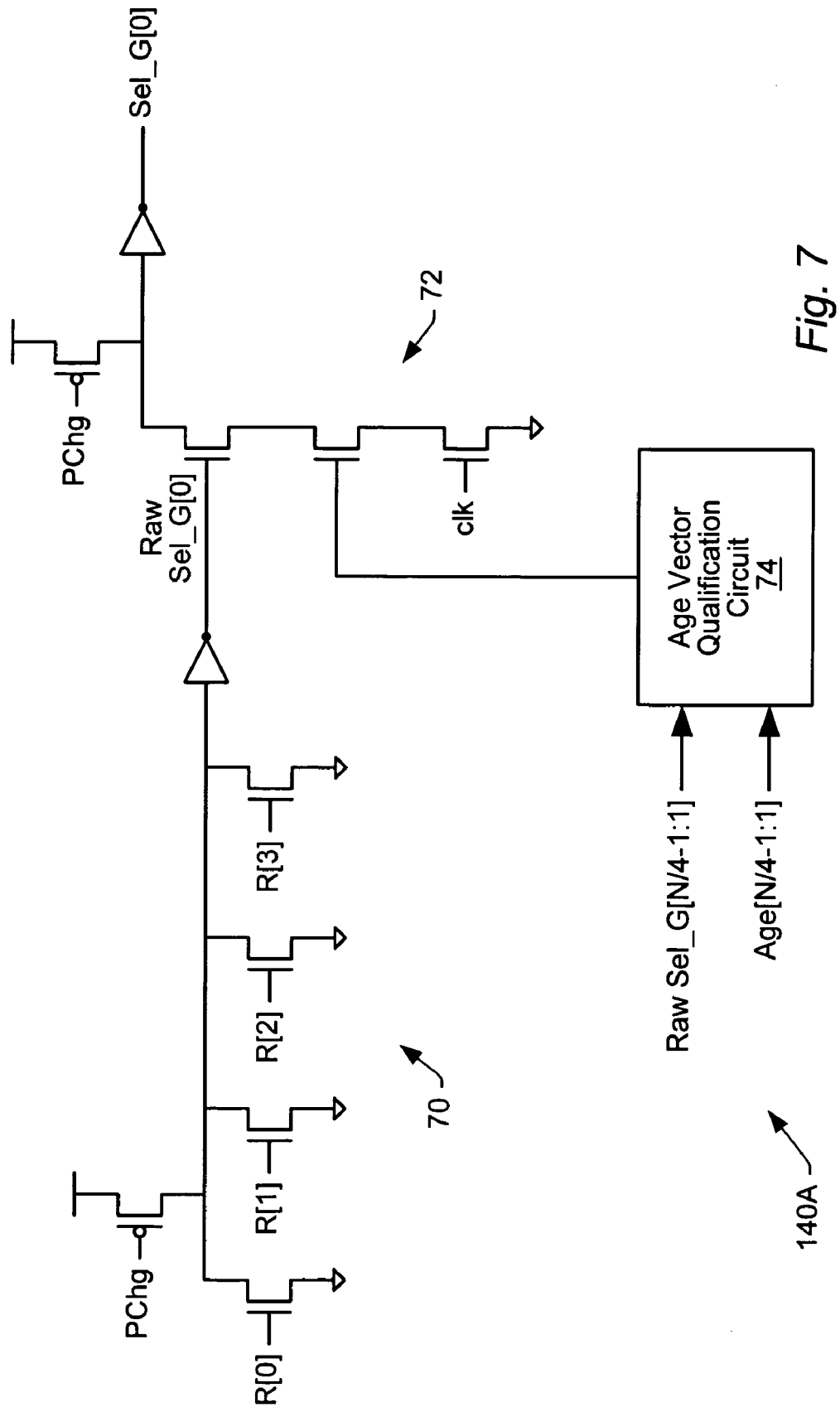
FIG. 7 is a circuit diagram illustrating one embodiment of selection logic for the control circuit shown in FIG. 5.

Turning next to FIG. 7, a circuit diagram illustrating a portion of one embodiment of the control circuit 14O (circuit 14OA) is shown. The portion illustrated in FIG. 7 generates the select signal for group 0 (Sel_G[0]). Similar circuitry may generate the other select signals (Sel_G[N/4-

1:1]). While dynamic digital logic circuitry is shown in FIG. 7, other embodiments may implement equivalent static digital logic circuitry.

The embodiment of FIG. 7 includes a dynamic OR gate 70 which logically ORs the ready bits from entries 0 through 3 (labeled R[0]–R[3] in FIG. 7) to generate a Raw Sel_G[0] signal. The Raw Sel_G[0] signal may be asserted if any of the ready bits R[0]–R[3] are set. In some embodiments, the dynamic OR gate 70 may comprise a dynamic AND-OR gate in which each ready bit is ANDed with an enable or other control signal.

Similar Raw Sel_G[N/4:1] signals may be generated for other groups (e.g. using similar dynamic OR gates 70), and the Raw Sel_G[N/4:1] signals may be input to an age vector qualification circuit 74. Additionally, the age vector for group 0 (Age[N/4-1:1 in FIG. 7) may be received by the age vector qualification circuit 74. The age vector qualification circuit 74 may output a signal indicative of whether or not an older group includes at least one entry with a ready bit asserted. For example, the age vector qualification circuit 74 may be similar to the AND gates 30A–30N and the NOR gate 32 in FIG. 3, except that the ready bit inputs to the AND gates 30A–30N may be replaced by the Raw Sel_G[N/4:1] signals and the number of AND gates 30A–30N may be equal to the number of groups, not the number of entries. The AND gates 30A–30N and the NOR gate 32 may be dynamic logic gates, in this embodiment. If the output of the age vector qualification circuit 74 is asserted and the Raw Sel_G[0] signal is asserted, the dynamic AND gate 72 asserts the Sel_G[0] signal. Otherwise, the Sel_G[0] signal is not asserted. Other embodiments may implement any other logic circuitry, as described with regard to FIG. 3.

In some embodiments, there may be a race condition between the Raw Sel_G[0] signal and the output of the age vector qualification circuit 74. In such embodiments, an additional transistor may be provided in series with the transistor having its gate coupled to receive the output of the age vector qualification circuit 74. The additional transistor may have its gate coupled to receive a clock input (clk in FIG. 7), and the output of the age vector qualification circuit 74 may change only when the clock input is low.

Figure 8:
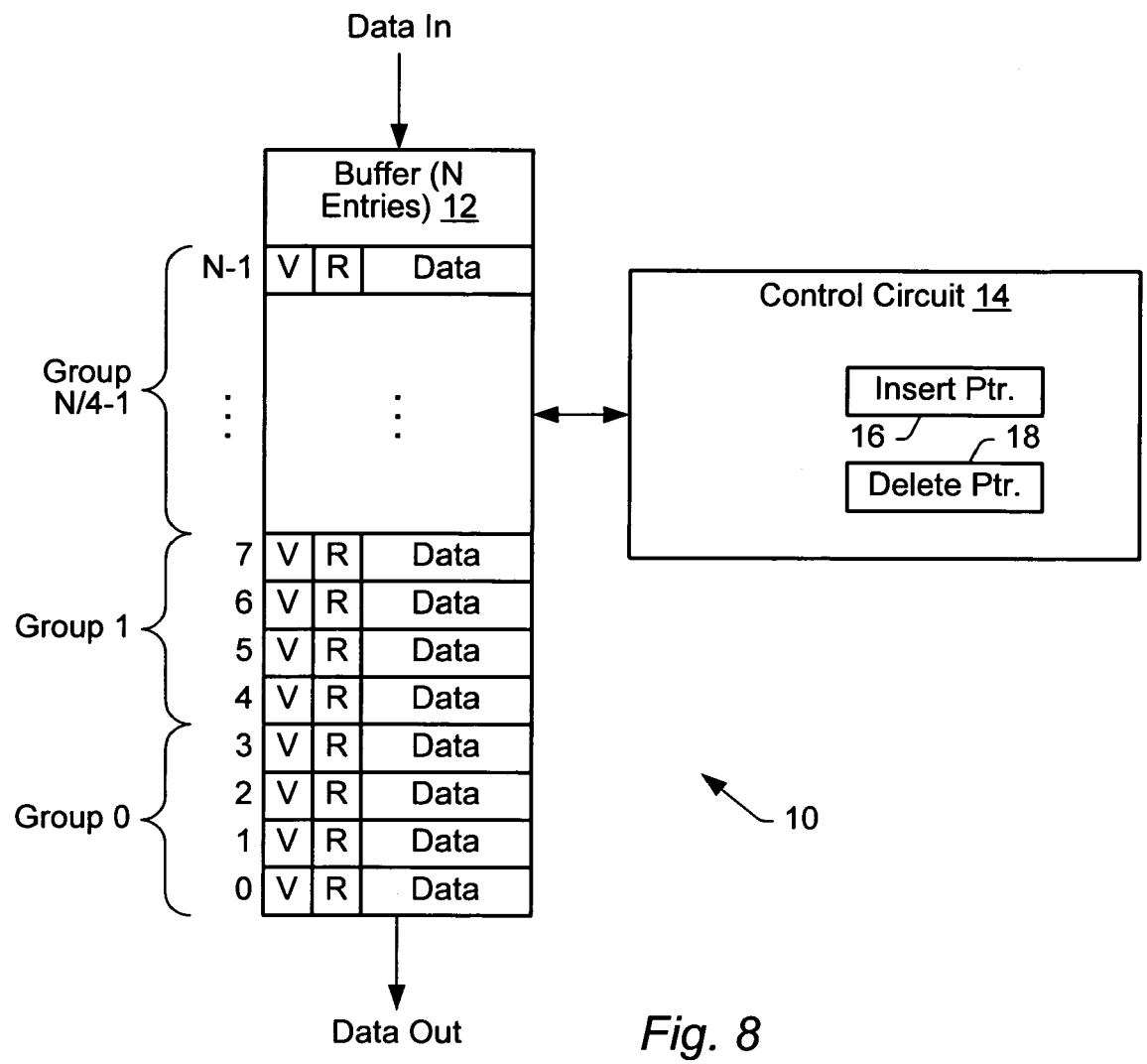
FIG. 8 is a block diagram of a third embodiment of the circular buffer.

While the age vector mechanism is used to select the oldest group in the embodiment of FIG. 5, in other embodiments it may be possible to use other mechanisms due to the simplification provided via grouping of entries and selecting groups, while in parallel selecting an entry in each group. For example, FIG. 8 is an embodiment of the circular buffer 10 that eliminates the age vectors. In the embodiment of FIG. 8, standard circular buffer find first circuitry may be used to select the oldest group (based on the position of the delete pointer 18 and the insert pointer 16), and positional find first circuitry may be used intra-group, as described above. The intra-group selection and the group-level selection may occur in parallel, as previously described. Such an embodiment may employ circuitry similar to that shown in FIG. 6, except that the control circuit 14O may not receive age vectors any more. The control circuit may implement circuitry similar to the circuit 14OA shown in FIG. 7 (static or dynamic digital logic circuitry), except that the age qualification circuit 74 may be replaced with circuitry that qualifies the Raw Sel_G[0] signal with standard circular buffer find-first circuitry based on the Raw Sel_G[N/4-1:1] signals, the delete pointer 18, and the insert pointer 16.

In one embodiment, the circular buffer 10 may be implemented as a scheduler for an execution circuit in a processor. The execution circuit may be one of two execution circuits designed for a certain operation type (e.g. arithmetic/logic unit (ALU)/address generation unit (AGU) operation or memory operation). The processor may include a trace cache that implements traces having up to 4 memory operations and 4 ALU/AGU operations. Thus, two of the operations in the trace (e.g. two of the ALU/AGU operations) may be written to the scheduler concurrently. The two operations from the trace may be stored into entries in the same group. The two operations may be grouped with another two operations from a different trace to form the groups of 4 described above.

Processor

Figure 9:
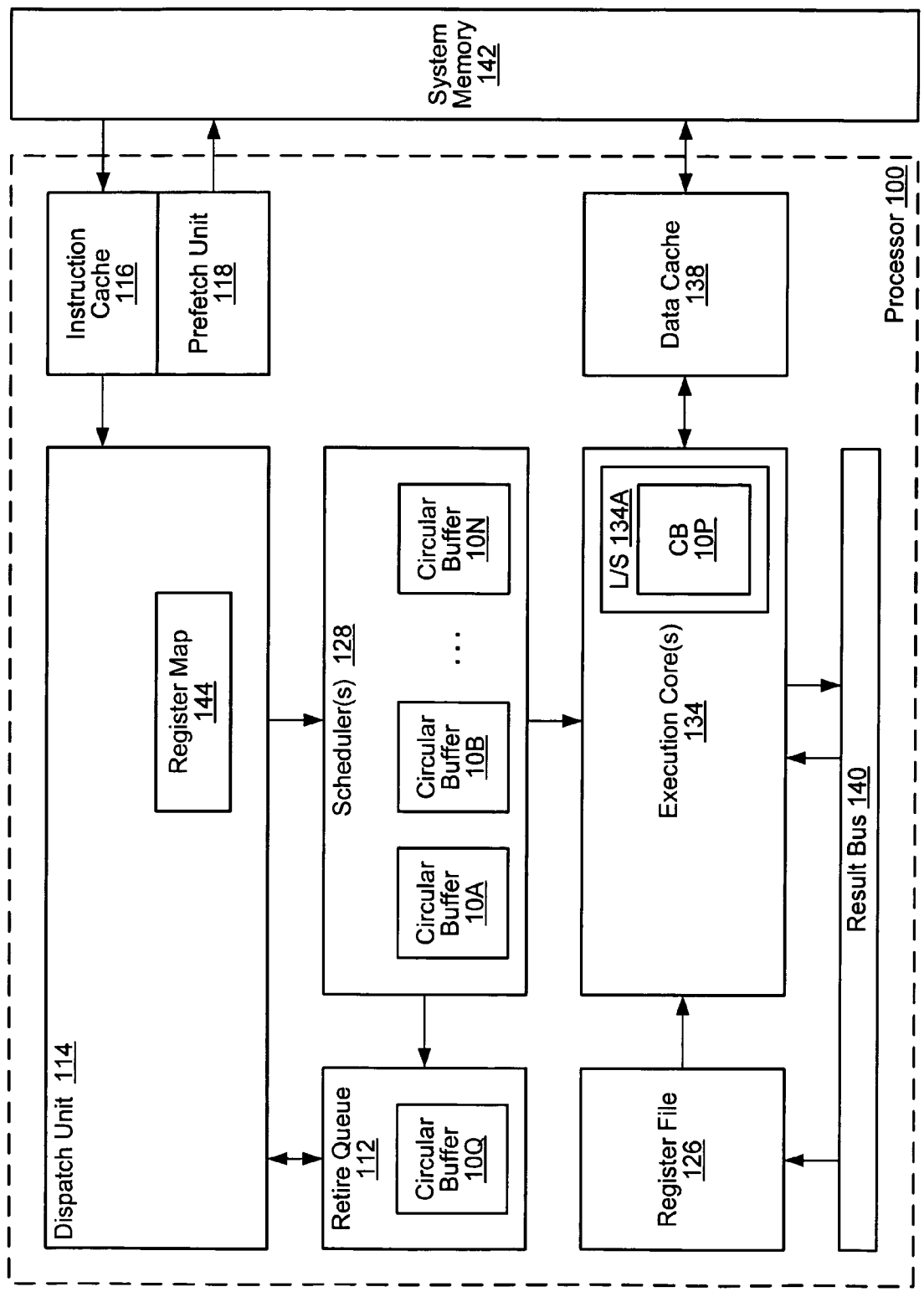
FIG. 9 is a block diagram of one embodiment of a processor that may implement one or more circular buffers.

FIG. 9 is a block diagram of one embodiment of a processor 100. The processor 100 is configured to execute instructions stored in a system memory 142. Many of these instructions operate on data stored in the system memory 142. It is noted that the system memory 142 may be physically distributed throughout a computer system and/or may be accessed by one or more processors 10.

In the illustrated embodiment, the processor 100 may include an instruction cache 116 and a data cache 138. The processor 100 may include a prefetch unit 118 coupled to the instruction cache 116. A dispatch unit 114 may be configured to receive instructions from the instruction cache 116 and to dispatch operations to the scheduler(s) 128. One or more of the schedulers 128 may be coupled to receive dispatched operations from the dispatch unit 114 and to issue operations to the one or more execution cores 134. The execution core(s) 134 may include one or more integer units, one or more floating point units (e.g. a floating point unit 36 illustrated in FIG. 9), and one or more load/store units. Results generated by the execution core(s) 134 may be output to a result bus 140. These results may be used as operand values for subsequently issued instructions and/or stored to the register file 126. A retire queue 112 may be coupled to the scheduler(s) 128 and the dispatch unit 114. The retire queue 112 may be configured to determine when each issued operation may be retired. In one embodiment, the processor 100 may be designed to be compatible with the x86 architecture (also known as the Intel Architecture-32, or IA-32). Note that the processor 100 may also include many other components. For example, the processor 100 may include a branch prediction unit (not shown).

The instruction cache 116 may store instructions for fetch by the dispatch unit 114. Instruction code may be provided to the instruction cache 116 for storage by prefetching code from the system memory 142 through the prefetch unit 118. Instruction cache 116 may be implemented in various configurations (e.g., set-associative, fully-associative, or direct-mapped).

The prefetch unit 118 may prefetch instruction code from the system memory 142 for storage within the instruction cache 116. The prefetch unit 118 may employ a variety of specific code prefetching techniques and algorithms.

The dispatch unit 114 may output operations executable by the execution core(s) 134 as well as operand address information, immediate data and/or displacement data. In some embodiments, the dispatch unit 114 may include decoding circuitry (not shown) for decoding certain instructions into operations executable within the execution core(s) 134. Simple instructions may correspond to a single operation. In some embodiments, more complex instructions may correspond to multiple operations. Upon decode of an operation that involves the update of a register, a register location within register file 126 may be reserved to store speculative register states (in an alternative embodiment, a reorder buffer may be used to store one or more speculative register states for each register and the register file 126 may store a committed register state for each register). A register map 144 may translate logical register names of source and destination operands to physical register names in order to facilitate register renaming. The register map 144 may track which registers within the register file 126 are currently allocated and unallocated.

The processor 100 of FIG. 9 may support out of order execution. The retire queue 112 may keep track of the original program sequence for register read and write operations, allow for speculative instruction execution and branch misprediction recovery, and facilitate precise exceptions. In some embodiments, the retire queue 112 may also support register renaming by providing data value storage for speculative register states (e.g. similar to a reorder buffer). In other embodiments, the retire queue 112 may function similarly to a reorder buffer but may not provide any data value storage. As operations are retired, the retire queue 112 may deallocate registers in the register file 126 that are no longer needed to store speculative register states and provide signals to the register map 144 indicating which registers are currently free. By maintaining speculative register states within the register file 126 (or, in alternative embodiments, within a reorder buffer) until the operations that generated those states are validated, the results of speculatively-executed operations along a mispredicted path may be invalidated in the register file 126 if a branch prediction is incorrect.

The register map 144 may assign a physical register to a particular logical register (e.g. architected register or microarchitecturally specified registers) specified as a destination operand for an operation. The dispatch unit 114 may determine that the register file 126 has one or more previously allocated physical registers assigned to a logical register specified as a source operand in a given operation. The register map 144 may provide a tag for the physical register most recently assigned to that logical register. This tag may be used to access the operand's data value in the register file 126 or to receive the data value via result forwarding on the result bus 140. If the operand corresponds to a memory location, the operand value may be provided on the result bus (for result forwarding and/or storage in the register file 126) through a load/store unit (not shown). Operand data values may be provided to the execution core(s) 134 when the operation is issued by one of the scheduler(s) 128. Note that in alternative embodiments, operand values may be provided to a corresponding scheduler 128 when an operation is dispatched (instead of being provided to a corresponding execution core 134 when the operation is issued).

As used herein, a scheduler is a device that detects when operations are ready for execution and issues ready operations to one or more execution units. For example, a reservation station may be one type of scheduler. Independent reservation stations per execution core may be provided, or a central reservation station from which operations are issued may be provided. In other embodiments, a central scheduler which retains the operations until retirement may be used. Each scheduler 128 may be capable of holding operation information (e.g., the operation as well as operand values, operand tags, and/or immediate data) for several pending operations awaiting issue to an execution core 134. In some embodiments, each scheduler 128 may not provide operand value storage. Instead, each scheduler may monitor issued operations and results available in the register file 126 in order to determine when operand values will be available to be read by the execution core(s) 134 (from the register file 126 or the result bus 140).

The processor 100 may implement circular buffers 10 in various places. For example, the scheduler(s) 128 may implement one or more circular buffers 10A–10N to store the operations, operand address, etc. awaiting issue to the execution cores 134. The ready bit for each entry may be set if the operands of the operation in that entry are available, for example, and thus the operation may be eligible for issue. A load/store unit 134A may be included in the execution cores 134 for handling memory operations and access to the data cache 138. The load/store unit 134A may receive addresses of the load/store memory operations from AGU units in the execution cores 134. The load/store unit 134A may implement one or more circular buffers (e.g. circular buffer 10P) to store addresses and other memory operation information. The ready bit may be set when the address has been received and thus the memory operation is ready to access the data cache 138. The retire queue 112 may also implement one or more circular buffers (e.g. circular buffer 10Q) to store retirement information. The ready bit may be set for an entry if the corresponding instruction is ready for retirement, for example.

Computer System

Figure 10:
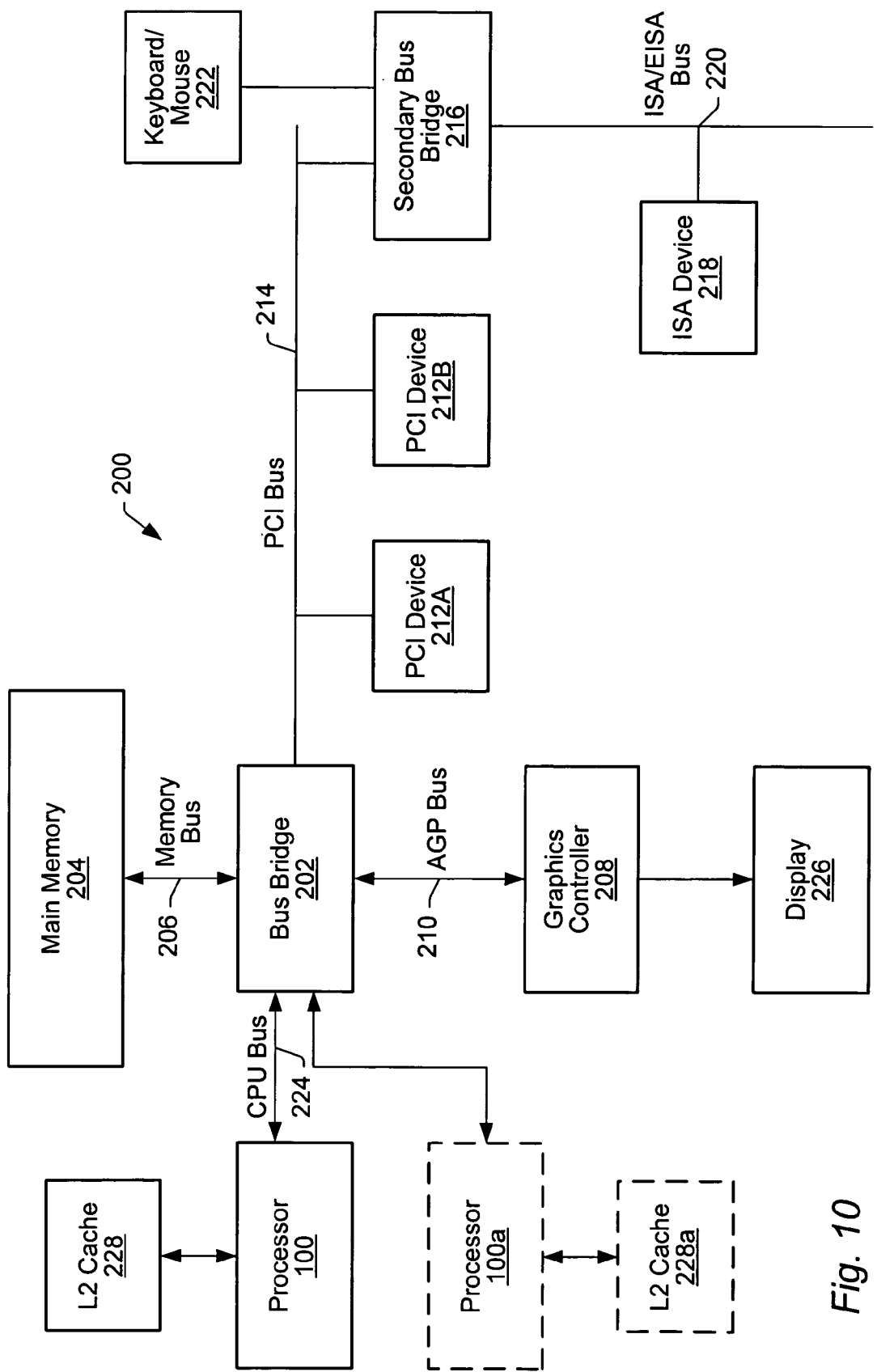
FIG. 10 is a block diagram of one embodiment of a computer system that includes one or more processors as shown in FIG. 9.

Turning now to FIG. 10, a block diagram of one embodiment of a computer system 200 including processor 100 coupled to a variety of system components through a bus bridge 202 is shown. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 100 is coupled to bus bridge 202 through a CPU bus 224 and to an optional L2 cache 228. Together, CPU bus 224 and the interface to L2 cache 228 may comprise an external interface to which external interface unit 18 may couple. The processor 100 may be the processor 100 shown in FIG. 9, and may include one or more circular buffers as shown and described with regard to FIGS. 1–8.

Bus bridge 202 provides an interface between processor 100, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 100 and bus bridge 202 in other embodiments. Alternatively, the external cache may be coupled to bus bridge 202 and cache control logic for the external cache may be integrated into bus bridge 202. L2 cache 228 is further shown in a backside configuration to processor 100. It is noted that L2 cache 228 may be separate from processor 100, integrated into a cartridge (e.g. slot 1 or slot A) with processor 100, or even integrated onto a semiconductor substrate with processor 100.

Main memory 204 is a memory in which application programs are stored and from which processor 100 primarily executes. A suitable main memory 204 comprises DRAM (Dynamic Random Access Memory). For example, a plurality of banks of SDRAM (Synchronous DRAM), double data rate (DDR) SDRAM, or Rambus DRAM (RDRAM) may be suitable. Main memory 204 may include the system memory 142 shown in FIG. 9.

PCI devices 212A–212B are illustrative of a variety of peripheral devices. The peripheral devices may include devices for communicating with another computer system to which the devices may be coupled (e.g. network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 100*a* shown as an optional component of computer system 200). Processor 100*a* may be similar to processor 100. More particularly, processor 100*a* may be an identical copy of processor 100. Processor 100*a* may be connected to bus bridge 202 via an independent bus (as shown in FIG. 10) or may share CPU bus 224 with processor 100. Furthermore, processor 100*a* may be coupled to an optional L2 cache 228*a* similar to L2 cache 228.

Figure 11:
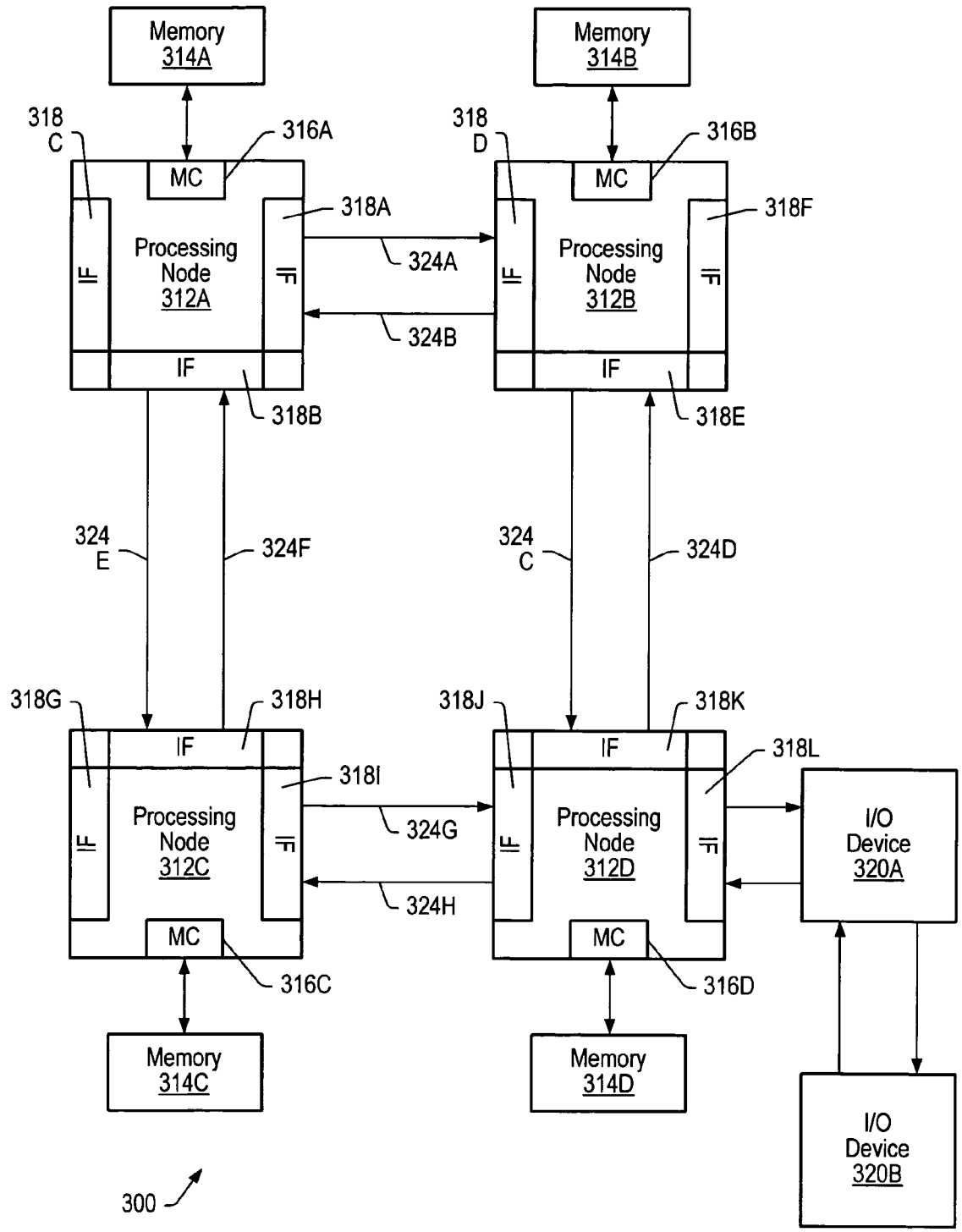
FIG. 11 is a block diagram of a second embodiment of a computer system that includes one or more processors as shown in FIG. 9.

Turning now to FIG. 11, another embodiment of a computer system 300 is shown. In the embodiment of FIG. 11, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 11. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 11. Any suitable routing algorithm may be used. Other embodiments of computer system 300 may include more or fewer processing nodes then the embodiment shown in FIG. 11.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 100 as shown in FIG. 9 (e.g. including one or more circular buffers as shown in FIGS. 1–8). External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), DDR SDRAM, static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include devices for communicating with another computer system to which the devices may be coupled (e.g. network interface cards or modems). Furthermore, I/O devices 320A–320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a buffer comprising a plurality of entries, wherein the plurality of entries are grouped into a plurality of non-overlapping groups, at least two entries included in each group;
   a plurality of age vectors, each of the plurality of age vectors corresponding to a different one of the plurality of groups, and wherein the age vector corresponding to a first group of the plurality of groups indicates which of the other groups of the plurality of groups contain data that is older than the data in the first group; and
   a control circuit coupled to the buffer, wherein the control circuit is configured, responsive to data being provided to the buffer to be written to at least a first entry of the plurality of entries, to generate a first age vector of the plurality of age vectors, the first age vector corresponding to a given group of the plurality of groups that includes at least the first entry, wherein the first age vector is indicative of which of the plurality of entries contain data that is older than the data being written to at least the first entry, and wherein the control circuit is configured to select a selected entry of the plurality of entries for reading responsive to the plurality of age vectors, the selected entry being the entry of the plurality of entries that: (i) has an attribute used to select the selected entry, and (ii) other entries indicated as storing older data in the age vector corresponding to the selected entry do not have the attribute.

2. The apparatus as recited in claim 1 wherein the control circuit comprises circuitry coupled to receive an indication of the attribute from each entry of the plurality of entries and to receive the plurality of age vectors, and wherein the circuitry is configured to generate the selection of the selected entry responsive to the indication of the selected entry indicating the attribute and responsive to the indications from other entries indicated as older than the selected entry in the age vector corresponding to the selected entry indicating that the other entries do not have the attribute.

3. The apparatus as recited in claim 1 wherein each of the plurality of age vectors comprises a plurality of indications, each indication corresponding to a different group of the plurality of groups.

4. The apparatus as recited in claim 3 wherein the control circuit generating the first age vector includes the control circuit being configured to: (i) set each of the plurality of indications in the first age vector that corresponds to an entry or entries that contain valid data to a first state indicating older, and (ii) set each of the plurality of indications in the first age vector that corresponds to an entry or entries not containing valid data to a second state indicating newer.

5. The apparatus as recited in claim 4 wherein the control circuit, responsive to data in an entry or entries being deleted from the buffer, is configured to set the corresponding one of the plurality of indications in each of the plurality of age vectors to the second state.

6. The apparatus as recited in claim 3 wherein the control circuit generating the first age vector includes the control circuit being configured to set each of the plurality of indications in the first age vector to a first state indicating older.

7. The apparatus as recited in claim 6 wherein the control circuit is configured, responsive to data being written into an entry or entries of the buffer, to set the corresponding one of the plurality of indications to a second state indicating newer in each of the plurality of age vectors.

8. The apparatus as recited in claim 1 wherein the control unit is configured to store the first age vector concurrent with writing the data to the first entry, and to use the first age vector in the selection of the selected entry.

9. A method comprising:
   receiving data to be written to at least a first entry of a plurality of entries in a buffer, wherein the plurality of entries are grouped into a plurality of non-overlapping groups, at least two entries included in each group;
   generating a first age vector of a plurality of age vectors responsive to receiving the data, each of the plurality of age vectors corresponding to a different one of the plurality of groups, and wherein the age vector corresponding to a first group of the plurality of groups indicates which of the other groups of the plurality of groups contain data that is older than the data in the first group, the first age vector corresponding to a given group including at least the first entry, and wherein the first age vector is indicative of which of the plurality of entries contain data that is older than the data being written to at least the first entry; and
   selecting a selected entry of the plurality of entries for reading responsive to the plurality of age vectors, the selected entry being the entry of the plurality of entries that: (i) has an attribute used to select the selected entry, and (ii) other entries indicated as storing older data in the age vector corresponding to the selected entry do not have the attribute.

10. The method as recited in claim 9 wherein each of the plurality of age vectors comprises a plurality of indications, each indication corresponding to a different group of the plurality of groups.

11. The method as recited in claim 10 wherein generating the first age vector comprises:
setting each of the plurality of indications in the first age vector that corresponds to an entry or entries that contain valid data to a first state indicating older; and
setting each of the plurality of indications in the first age vector that corresponds to an entry or entries not containing valid data to a second state indicating newer.

12. The method as recited in claim 11 further comprising, responsive to data in an entry or entries being deleted from the buffer, setting the corresponding one of the plurality of indications in each of the plurality of age vectors to the second state.

13. The method as recited in claim 10 wherein generating the first age vector comprises setting each of the plurality of indications in the first age vector to a first state indicating older.

14. The method as recited in claim 13 further comprising, responsive to data being written into an entry or entries of the buffer, setting the corresponding one of the plurality of indications to a second state indicating newer in each of the plurality of age vectors.

15. The method as recited in claim 9 further comprising storing the first age vector concurrent with writing the data to the first entry, and the selecting is responsive to the first age vector.

16. A processor comprising one or more circular buffers, each of the circular buffers comprising:
a buffer comprising a plurality of entries, wherein the plurality of entries are grouped into a plurality of non-overlapping groups, at least two entries included in each group;
a plurality of age vectors, each of the plurality of age vectors corresponding to a different one of the plurality of groups, and wherein the age vector corresponding to a first group of the plurality of groups indicates which of the other groups of the plurality of groups contain data that is older than the data in the first group; and
a control circuit coupled to the buffer, wherein the control circuit is configured, responsive to data being provided to the buffer to be written to at least a first entry of the plurality of entries, to generate a first age vector of the plurality of age vectors, the first age vector corresponding to a given group of the plurality of groups that includes at least the first entry, wherein the first age vector is indicative of which of the plurality of entries contain data that is older than the data being written to at least the first entry, and wherein the control circuit is configured to select a selected entry of the plurality of entries for reading responsive to the plurality of age vectors, the selected entry being the entry of the plurality of entries that: (i) has an attribute used to select the selected entry, and (ii) other entries indicated as storing older data in the age vector corresponding to the selected entry do not have the attribute.

17. The processor as recited in claim 16, wherein the one or more circular buffers include at least one circular buffer implemented in a scheduler, the data stored in each entry comprising operations to be executed by one or more execution cores in the processor.

18. The processor as recited in claim 16, wherein the one or more circular buffers include at least one circular buffer implemented in a retire queue.

19. The processor as recited in claim 16, wherein the one or more circular buffers include at least one circular buffer implemented as a load/store buffer storing load/store operations.

* * * * *